United States Patent [19]

Goglanian

[11] Patent Number: 5,045,329

[45] Date of Patent: Sep. 3, 1991

[54] PERFORATED PITA BREAD

[76] Inventor: Alexander Goglanian, 401 E. 15th St., Newport Beach, Calif. 92660

[21] Appl. No.: 843,728

[22] Filed: Mar. 25, 1986

Related U.S. Application Data

[62] Division of Ser. No. 488,154, Apr. 25, 1983, Pat. No. 4,597,979.

[51] Int. Cl.$^5$ ............................................. A21D 13/00
[52] U.S. Cl. .................................... 426/106; 426/128; 426/138; 426/496; 426/503; 426/549; 426/76; 426/559; 426/128
[58] Field of Search ............... 426/496, 503, 138, 549, 426/76, 559

[56] References Cited

U.S. PATENT DOCUMENTS

| | | | |
|---|---|---|---|
| 1,319,899 | 10/1919 | Rafert | 426/76 |
| 1,565,887 | 12/1925 | Andrus . | |
| 1,566,151 | 12/1925 | McDonough . | |
| 1,891,845 | 12/1932 | Spitz et al. . | |
| 1,929,358 | 10/1933 | Keefer . | |
| 1,945,755 | 2/1934 | Scruggs, Jr. . | |
| 2,072,793 | 3/1937 | Brennan | 426/503 |
| 2,858,776 | 11/1958 | Temple . | |
| 3,444,826 | 5/1969 | Seeder et al. | 225/96 |
| 3,765,909 | 10/1973 | Moline . | |
| 3,917,868 | 11/1975 | Tobey et al. . | |
| 4,202,911 | 5/1980 | Papantoniou et al. | 426/502 |
| 4,246,838 | 1/1981 | Pulver et al. . | |
| 4,264,635 | 4/1981 | Wilde | 426/517 |
| 4,597,979 | 7/1986 | Goglanian | 426/496 |

OTHER PUBLICATIONS

Margaret Banai, "What's Cooking in Israel", Thomas J. Crowel Company, New York, 1973.

*Primary Examiner*—Joseph Golian
*Attorney, Agent, or Firm*—Knobbe, Martens, Olson & Bear

[57] ABSTRACT

After pita dough has been rolled and prior to baking of the dough to form pita bread, the flat pancake-like dough form is weakened along a perforation or score line on at least one side of the dough form. In the baking process the dough form seals and inflates to form the central void characteristic of pita bread. The perforation or score line forms a weakened section in the inflated skin of the baking dough so that the rupture of the pita skin during the baking process occurs preferentially at the perforation or score line. The pita bread which results from this baking process is easily torn at the perforation or score line. Since the perforations cause the baking-caused rupture to be located at the tear line, the pocket formed by the pita bread when it is torn and opened by the user will not include a baking-caused rupture.

5 Claims, 2 Drawing Sheets

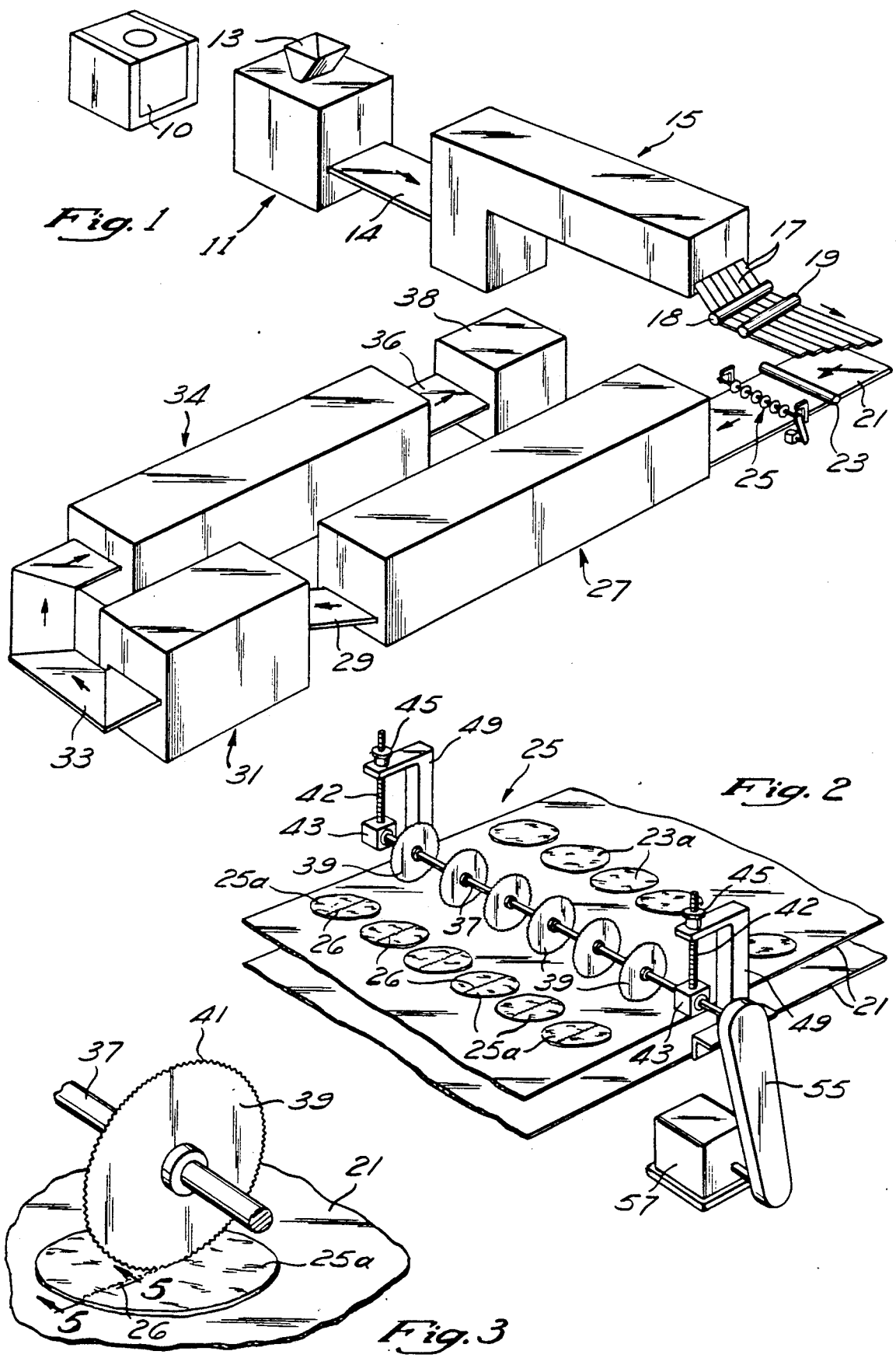

PERFORATED PITA BREAD

This application is a division of application Ser. No. 488,154, now U.S. Pat. No. 4,597,979, filed Apr. 25, 1983.

BACKGROUND OF THE INVENTION

Pita bread is a common staple in middle eastern countries and in recent years has enjoyed considerable and increasing popularity in other areas of the world. This popularity is due in part to the convenience of using pita bread for making a sandwich since the bread, when torn, forms a pocket which may be filled with meat, cheese, and other edible material.

In its most common form pita bread is in the shape of a large flat pancake, typically four to eight inches in diameter and one eighth to three eighths inches in thickness. Because of the process used in baking the pita bread, this flat disk actually comprises two outer layers or skins which are easily separated by the user.

Typically, the user will make a sandwich by tearing the pita bread in half, forming two semi-disks which can each be used to make a sandwich. Alternatively, the pita bread may be torn, cut, or otherwise severed to form a large and small disk segment, with the large disk segment being used to make a sandwich. Finally, not uncommonly, the pita bread may be cut or torn along one circular edge so that the entire pita bread may be filled with edible material to make a larger sandwich.

The double layer form which is characteristic of pita bread results from a baking process which is likewise characteristic of pita bread. In this process a ball of dough is rolled to form a large flat dough disk, not unlike a large pancake in appearance. The disk is baked in an extremely hot oven, typically in excess of 500° fahrenheit on a flat support surface. This rapid baking process causes the bread dough to initially sear and to thus seal the top, bottom, and edge surfaces of the dough disk. The dough in the central portion of the pita then bakes and, as a consequence of the baking process, liberates gas and steam from the dough. This gas and steam creates pressure within the dough disk which inflates the disk. Since the gas is unable to escape through the sealed perifory of the disk, this inflating process separates the upper and lower surfaces of the disk form so that during the baking process the pita bread resembles an inflated football. This inflation continues until the pita is filled to capacity with steam and gas and the pita then ruptures at its weakest surface location so that additional steam and gas created by the continuing baking process can escape.

At the completion of the baking process the pita bread is allowed to cool. As the gasses within the pita bread cool and continue to escape through the rupture in the pita skin, the pita again assumes a flat, pancake-like appearance. However, since throughout most of the baking process the two skins of the pita bread are separated by the expanded form of the dough during baking, the pita bread, in its final form, has a distinct upper and lower layer.

A common use for pita bread is the formation of a sandwich Typically, a user will tear the pita bread in half, forming two semi-disks of dough. These semi-disks will have a relatively straight edge on one side, exposing the two distinct layers of the pita bread, and will have a sealed semi-circular remaining edge. The user can then separate the layers along the torn or cut straight edge and spread these layers, forming a pocket with the pita bread half. Edible material such as meats, cheeses, etc, may be stuffed into the open pocket to form a sandwich One reason for the popularity of this type of pita sandwich is the fact that the pita bread half forms a natural pouch which is relatively durable and thus not likely to spill when the sandwich is eaten, and which also has less bread than more common sandwiches, thus yielding a lower calorie sandwich.

Alternatively, sandwiches are typically formed with pita bread by cutting or tearing the pita bread at locations other than along its diameter For example, it is not uncommon to form a sandwich by tearing along a cord of the pita disk removed from the diameter to form a large pocket segment and a small pocket segment, the large pocket segment used to make a single, larger sandwich from the pita bread. In addition, it is not uncommon to cut or tear the pita bread along a circular line following a portion of the circumference of the pita bread to make a single, large pocket from the entire pita bread, and thus a large sandwich.

Because the location of the baking-induced rupture in the pita bread is unpredictable, occurring at the weakest surface of the pita bread during the baking process, sandwiches formed in the above described manners virtually always include a rupture. Even when the pita bread is torn in half to make two sandwich pouches, one of these sandwich pouches will include a baking-induced rupture. The rupture may also occur across the tear or cutting line when the sandwich is made, leaving a torn edge at which the stresses induced during the sandwich making process will commonly cause further tearing and an unsightly sandwich. The rupture in the pita bread, of course, provides a location where sandwich filling material can easily leak or fall from the pita bread pocket and also causes a stress concentration point where further tearing of the natural pouch is likely. These undesirable results are a natural consequence of the pita baking process and have reduced, to some extent, the attractiveness of pita bread as a sandwich encapsulater.

An additional disadvantage of typical pita bread is the fact that, unless the bread is cut with a knife, tearing of the pita bread typically creates an uneven edge which follows the weak portions of the bread's surface. This increases the difficulty in making a neat appearing sandwich or pair of sandwiches from pita bread.

SUMMARY OF THE INVENTION

The present invention involves a process used during the baking of pita bread which increases the utility of pita bread for sandwich making without interfering with the normal pita baking process. After the dough has been rolled to form the pancake-like disk, and prior to baking, the dough is weakened along a line which will ultimately form the tear line for making sandwiches. This weakened line may either be formed along the diameter of the pita bread or parallel to a diameter, but offset from the center of the pita bread, or along a circular edge of the dough form.

The weakened line in the dough form may be formed either by perforating the dough along the weakened line or by simply making the dough form thinner along an ultimate tear line. In either case, as the dough is baked and the pita bread inflates, the weakened line in the dough form creates a location where the skin of the pita bread will preferentially rupture. Thus the dough form is not severed sufficiently to prohibit natural inflation of the pita dough form into a ball-like shape, but only sufficiently to cause the steam and gas from the inside of the baking form to preferentially escape along the ultimate tear line.

The weakened preferential rupture line is formed in the disk of dough by a serrated cutter which may be pressed into the dough or a serrated disk, which rotates above a conveyor carrying the dough disk into the baking oven. In either case it has been found that serrations permit the dough form to be scored or thinned without interfering with the normal baking process. It is believed that, even if the dough is pierced at each serration, the dough nevertheless re-seals prior to the baking process and during the initial stages of the baking process so that the serrations simply yield a weakened line rather than holes in the surface of the dough form which would prohibit the inflation necessary for normal baking of pita bread.

The weakened section of the pita surface creates a preferential rupture line as well as a weakened line for ultimate tearing by the user. Thus, the user, in making a sandwich, will tear the pita bread along the weakened line, coincident with the rupture line, so that the sandwich pockets which are formed by the user will not include a baking-induced rupture. This forms a much neater sandwich pouch than was previously possible, and avoids leakage of the sandwich filling. In addition, the weakened line along the bread's surface facilitates tearing by the user so that a relatively neat, straightline tear may be made across the pita bread to form one or two sandwich pockets.

These and other advantages of the present invention are best understood through the following detailed description of the product and the process for making it. This description makes reference to the accompanying drawings, in which:

FIG. 1 is a schematic perspective view of a pita bread manufacturing system which includes serrating disks in accordance with the process of this invention.

FIG. 2 is an enlarged perspective view of that portion of the apparatus of FIG. 1 which accomplishes the perforating process of the present invention;

FIG. 3 is an enlarged perspective view of a pita dough form being provided with a preferential rupture line by one of the disks of FIGS. 1 and 2;

DETAILED DESCRIPTION OF THE PREFERRED EMBODIMENT

Figure 4:
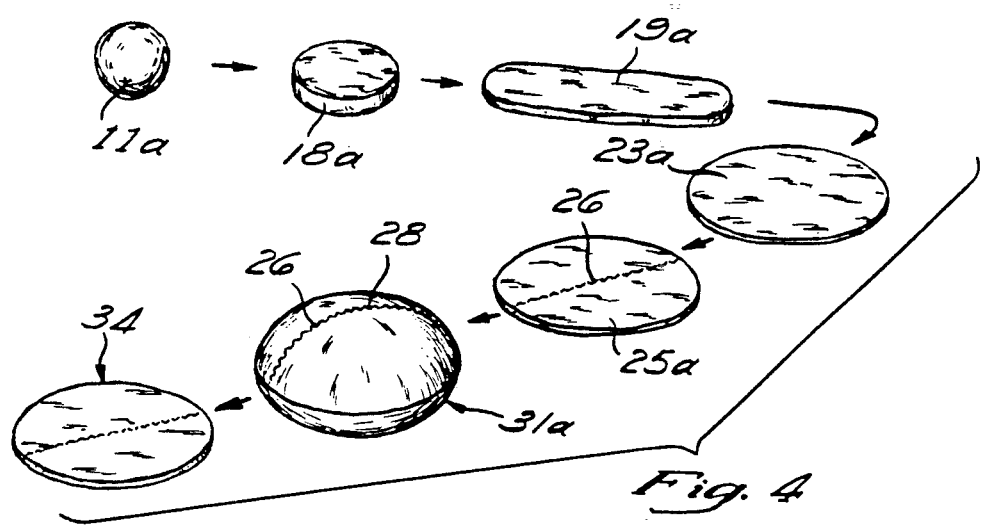
FIG. 4 is a schematic flow chart illustration showing the form of the dough and pita bread during the various processes which occur in the apparatus of FIG. 1.

Referring initially to FIG. 1, apparatus for manufacturing and baking pita bread is shown schematically. In a typical apparatus, a mixer 10 blends the various ingredients used in making pita bread dough. Thus, dough is added to a dividing stage 11 through a hopper 13. This dough is rounded and formed into individual spheres or balls of dough in the rounding stage 11, which are then transported on a conveyor 14 to an intermediate rising or proofing apparatus 15. Note should be made of the fact that initial proofing occurs between the mixer 10 and divider 11. In the rising or proofing apparatus 15 the dough balls are subjected to warm temperatures so that the dough will rise to form larger spheres or balls. These larger spheres or balls are then transported on multiple conveyor belts 17 and pass beneath an initial pair of rollers 18 and 19 which form the balls or spheres into flat oval shapes resembling oval pancakes.

Referring to FIG. 4, the initial form of the dough balls is shown as 11a in the form that the dough balls exit the dividing apparatus 11 of FIG. 1. During the rising process which occurs in the poofing or rising chamber 15, the dough enlarges in volume and typically maintains the shape as shown at 11a in FIG. 4. The initial rolling operation provided by the roller 18 flattens the dough balls to the shape 18a of FIG. 4, and the rolling operation of the roller 19 yields the oval pancake-like shape 19a shown in FIG. 4.

Referring again to FIG. 1 the dough is next passed from the conveyors 17 to a conveyor 21 which transports the dough in a direction which is perpendicular to the direction of transportation on the conveyors 17. On the conveyer 21 the dough passes under an additional roller 23 which passes over the dough in a direction which is normal to the passage of the rollers 18 and 19, yielding the circular flat shape shown at 23a in FIG. 4. The pita bread in the form shown at 23a is ready for baking and, if baked in this form, would yield typical pita bread. Referring again to FIG. 1, the dough form passes through the apparatus used in the present invention which is shown generally at 25, into a final proofer 27, transferred by the conveyor 21. Referring to FIG. 4, the apparatus of the present invention forms a preferential rupture line 26 in the dough form 25a prior to baking.

The pita bread is transferred from the final proofer 27 to an oven 31 on a conveyor 29. When the pita bread is baked in the oven 31 (FIG. 1), it expands into a hollow ball or sphere as shown at 31a in FIG. 4. As previously described and is well-known in the pita bread baking art, the temperature of the oven 31 is high enough so that the dough form will initially sear and seal on its outside surface, preventing the escape of gas from the pita bread dough. As the dough continues to bake, steam and other gas is formed by the baking process. This steam and other gas is captured within the dough form and causes the dough form to inflate into the shape shown at 31a in FIG. 4, separating the upper and lower surfaces of the pita bread into two distinct layers. This steam and other gas will ultimately completely fill the void within the ball or sphere 31a and, as the baking continues, must rupture the skin of the ball or sphere at its weakest point. Because a preferential rupture line 26 has been formed along the surface of the pita bread, this rupture will preferentially occur at some location along the preferential rupture line 26, as shown at 28 in FIG. 4.

Referring again to FIG. 1, the pita bread, now baked completely, passes from the oven 31 on a conveyor 33 into a cooling chamber 34 in which the pita bread is gradually cooled. During this cooling, the remaining gas within the pita bread will escape through the rupture 28 so that the bread again flattens into the characteristic pita bread shape shown at 34a in FIG. 4. After cooling, the pita bread is carried on a conveyor 36 to a packaging apparatus 38 in which the pita bread is stacked and packaged for sale.

Referring now to FIGS. 2 and 3, the details of the apparatus used to create the preferential rupture lines on the pita bread dough at location 25 of FIG. 1 will be explained in more detail. The conveyor 21 is in the form of an endless belt. The pita bread, prior to arrival at station 25 has been accurately positioned so that, for example, the disk-shaped dough forms pass through the proofer six abreast as shown in FIG. 2. A driven shaft 37 carries a corresponding set of six perforating disks 39 which are best shown in FIG. 3. These disks 39 advantageously include a serrated edge 41 and the disks 39 are positioned, as shown in FIG. 2, along the length of the driven shaft 37 to coincide with the central diameter of the respective dough forms 25a.

The height of the driven shaft 37 is adjusted by a pair of threaded adjusting rods 42 which support the driven shaft 37 in pillow blocks 43. The driven shaft 37 is thus free to rotate in the blocks 43 and its vertical position is adjustable by rotating a pair of adjusting nuts 45 which are threaded onto the rods 42 and bear against the top of a pair of supporting brackets 49.

Figure 5:
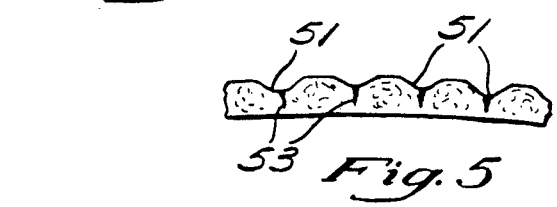
FIG. 5 is a cross-sectional view of the pita bread taken along lines 5—5 in FIG. 3 to show the weakening of the dough along the preferential rupture line.

FIG. 5 shows a cross-sectional view of the pita bread along lines 5—5 of FIG. 3 after serration by the serrating disk 39. It will be seen that the disk 39 advantageously does not pierce the pita dough form completely at any point, but rather thins the dough at the points marked 51 and partially ruptures the dough below this thinning point as shown at 53. This thinning and rupturing process occurs along a line of preferential rupture 26 shown in FIG. 3. This preferential rupture line 26 in the embodiment shown in FIGS. 2, 3, and 5, occurs diametrically across the center of each pita dough form and creates a weakened line along the surface of the pita dough.

Referring again to FIG. 2, in the preferred embodiment, the driven shaft 37 is connected, as by a chain enclosed within a housing 55, to a motor 57, and is driven in synchronism with the belt 21 so that the tangential velocity at the edge of the disks 39 is identical to the linear speed of the belt 21. This causes the edge 41 of the disks 39 to roll along the top of the pita dough form 25a without slipping.

Alternatively, the friction between the dough form 25a and the disks 39 may be used to rotate the disks 39, thereby eliminating the motor 57, although the embodiment shown in FIG. 2 is preferred.

The height of the driven shaft 37, and therefore the height of the disks 39, is accurately adjusted by rotation of the nuts 45 so that each of the six-abreast pita dough forms 25a is identically weakened by the disks 39. Specifically, the height of the disks 39 should be such that the serrated edge 41 reduces the thickness of the pita dough form by approximately 50% at the maximum point of indentation. It has been found that the process will function even if the serrated edge 41 completely pierces the pita dough form at the deepest point of penetration. With this deep penetration, the dough, on passing through the final proofer 27 (FIG. 1), will partially seal the penetration, resulting in a weakened line which will cause preferential rupture of the pita bread along this preferential rupture line 26.

Figure 6:
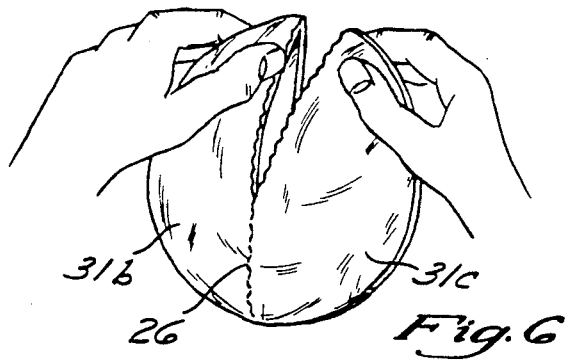
FIG. 6 is a perspective view showing the use of the preferential rupture line for providing a preferential tear line useful in the formation of sandwich pockets from pita bread.

As previously explained in reference to FIG. 4, the pita dough 31a, upon inflation during baking, will preferentially rupture along this weakened line 26. Referring now to FIG. 6, it can be seen that the user, in preparation for making a pita sandwich, can easily tear the pita bread in half, since the same preferential rupture line 26 which causes the pita dough form to rupture, weakens the skin of the pita bread, facilitating a neat tear line 26 without ragged edges. Even more important is the fact that this neat tear line is coincident with the preferential rupture line 26 so that the rupture in the pita bread which occurs during baking will exist along the tear line 26 of FIG. 6. Thus, each half 31b and 31c of the pita bread will be rupture free. Thus, when a sandwich is made from these halves 31b and 31c, there will be no baking-induced rupture to cause the sandwich ingredients to fall from the natural pocket.

Figure 7A:
FIGS. 7a through 7d show alternate pita bread shapes and exemplary preferential rupture and tear lines in accordance with the present invention.
Figure 7B:
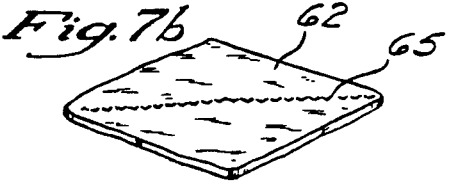
Figure 7C:
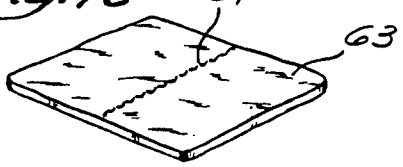

As shown in FIG. 7a, it is possible to eliminate the second roller stage 23 of FIG. 1, resulting in an oval pita form 59 with a preferential rupture and tear line 61, as opposed to the circular disk shape more characteristic of pita bread. Likewise, as shown in FIGS. 7b and 7c, the mixing and rolling operation of FIG. 1 may be altered to form square or rectangular pita bread forms 61 and 63 which may be weakened along either a diagonal preferential rupture line 65 as shown in FIG. 7b, or a diameteric preferential rupture line 67 as shown in FIG. 7c.

Figure 7D:
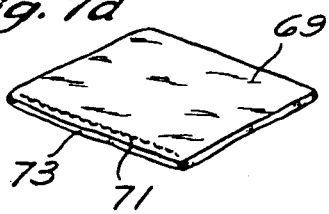

Likewise, such a square pita bread form 69 is shown in FIG. 7d. In this figure, however, the preferential rupture line 71 has been formed adjacent one edge 73 of the square pita dough 79. In this case, the user may tear the pita bread along the preferential rupture and tear line 71, discarding the edge 73 and yielding a large pocket for the making of a sandwich from virtually the entire pita bread form 69.

Figure 8:
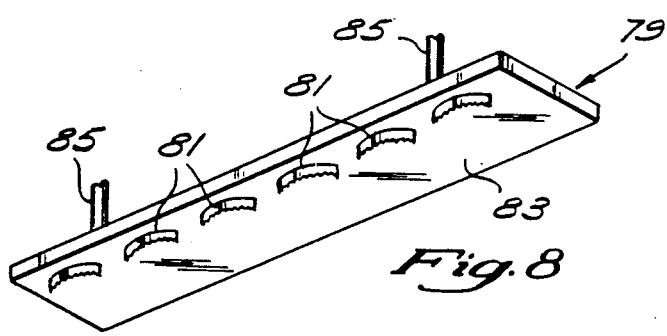
FIG. 8 shows a cutting die which may be used for forming preferential rupture lines along the circumference of circular pita bread.
Figure 9:
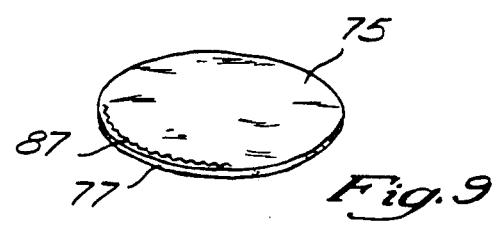
FIG. 9 shows a pita dough form after perforation by the die of FIG. 8.

In a manner similar to that shown in FIG. 7d, it is sometimes advantageous, especially for making larger sandwiches, to be able to tear a circular pita bread 75, as shown in FIG. 9, along a portion of its circular edge 77. This may be accomplished in accordance with the present invention by utilizing a cutter 79, shown in FIG. 8, which includes plural semi-circular serrated knives 81 mounted on a bar 83 which is, in turn, reciprocated by a pair of driving shafts 85. The driving shafts 85 may be reciprocated, for example, hydraulically or pneumatically, beneath the supports 49 shown in FIG. 2. This operation must, of course, be carefully timed so that the bar 83 is hydraulically or pneumatically lowered as the pita dough forms arrive at the proper location beneath the bar 83, yielding a preferential tear line 87 along the edge 77 as shown in FIG. 9 The user may then tear the edge of the pita bread along the preferential rupture and tear line 87, discarding the edge 77 in order to make a large sandwich from virtually the entire pita bread 75, stuffing the ingredients into the open edge.

As will be seen, each of the embodiments shown in this application includes a weakened line formed in the dough prior to baking. This weakened line causes a preferential rupturing of the pita bread at the weakened line during baking so that this preferential rupture line will be coincident with a tear line which the user may utilize to open the pita bread to form pockets for the formation of sandwiches. The weakening of the dough is sufficient to cause preferential rupturing, but is not sufficient to interfere with the normal inflation of the entire pita bread as a unit as shown at 31a in FIG. 4, since such interference would prohibit proper baking of the pita bread dough.

What is claimed is:

1. A package containing a plurality of pitas; each pita within said package comprising:
  baked dough having a pair of overlapping layers, said layers sealed together at their respective edges to form an outside surface and an inside surface;
  a weakened line on the outside surface of said pita, said line having a thickness which is less than the thickness of the baked dough between said outside surface and said inside surface; and
  a baking induced rupture coincident with said weakened line;
  the weakened line on each of said plurality of pitas being in substantially the same position.

2. A package containing a plurality of pitas as defined in claim 1 wherein said weakened line on each of said plurality of pitas extends from a point on the edge of said at least one layer of each pita across the surface of said at least one layer to another point on the edge of said at least one layer.

3. A package containing a plurality of pitas as defined in claim 1, wherein said weakened location on each of said plurality of pitas is a straight line.

4. A package containing a plurality of pitas as defined in claim 1, wherein said weakened location on each of said plurality of pitas is formed of a sequence of regularly spaced indentations.

5. A package containing a plurality of pitas as defined in claim 1, wherein said weakened location on each of said plurality of pitas is a line which bisects one of said layers to divide said layer into two substantially equal sections.

* * * * *

UNITED STATES PATENT AND TRADEMARK OFFICE
CERTIFICATE OF CORRECTION

PATENT NO. : 5,045,329

DATED : September 3, 1991

INVENTOR(S) : Alexander Goglanian

It is certified that error appears in the above-identified patent and that said Letters Patent is hereby corrected as shown below:

```
Col 2 line 4, "form a sandwich", should be "form a sandwich."
     line 12, "along its diameter" should be "along its diameter.".

Col 7 line 15 "a weakened line" should be "a weakened location".
     line 16, "said line" should be "said location".
     line 21, "weakened line" should be "weakened location".

Col 8 line 1, "the weakened line" should be "the weakened location".
     line 4, "said weakened line" should be "said weakened location".
```

Signed and Sealed this

Tenth Day of August, 1993

*Attest:*

MICHAEL K. KIRK

*Attesting Officer*   Acting Commissioner of Patents and Trademarks